(12) United States Patent
Griffioen (10) Patent No.: US 10,827,438 B2
(45) Date of Patent: Nov. 3, 2020

(54) SYSTEMS AND METHODS FOR DETERMINING AN OVER POWER SUBSCRIPTION ADJUSTMENT FOR A RADIO EQUIPMENT

(71) Applicant: Telefonaktiebolaget LM Ericsson (publ), Stockholm (SE)

(72) Inventor: Robert Griffioen, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/088,787

(22) PCT Filed: Mar. 31, 2016

(86) PCT No.: PCT/IB2016/051854
§ 371 (c)(1),
(2) Date: Sep. 26, 2018

(87) PCT Pub. No.: WO2017/168213
PCT Pub. Date: Oct. 5, 2017

(65) Prior Publication Data
US 2019/0313346 A1    Oct. 10, 2019

(51) Int. Cl.
*H04W 52/34* (2009.01)
*H04B 17/13* (2015.01)
(Continued)

(52) U.S. Cl.
CPC ............ *H04W 52/34* (2013.01); *H04B 17/13* (2015.01); *H04B 1/00* (2013.01); *H04W 52/143* (2013.01);
(Continued)

(58) Field of Classification Search
CPC .... H04W 52/00–60; H04B 17/13; H04B 1/00
See application file for complete search history.

(56) References Cited

U.S. PATENT DOCUMENTS

| | | | |
|---|---|---|---|
| 7,194,022 B2 | 3/2007 | Honkanen et al. | |
| 2005/0149463 A1* | 7/2005 | Bolt | G06N 3/08 706/20 |

(Continued)

FOREIGN PATENT DOCUMENTS

| | | |
|---|---|---|
| CN | 103999368 A | 8/2014 |
| CN | 104320834 A | 1/2015 |

(Continued)

OTHER PUBLICATIONS

Hagan, Martin T., et al., "Neural Network Design," 2nd Edition, 2014, Oklahoma State University, retrieved Sep. 4, 2018, URL: "http://hagan.okstate.edu/NNDesign.pdf," 1012 pages.

(Continued)

*Primary Examiner* — Raymond S Dean
(74) *Attorney, Agent, or Firm* — Withrow & Terranova, PLLC (57) ABSTRACT

Systems and methods for determining an over power subscription adjustment for a Radio Equipment (RE) are provided. In some embodiments, a method of operation of an RE includes determining an over power subscription adjustment for one or more carriers based on one or more system parameters and providing the over power subscription adjustment to a Radio Equipment Controller (REC) for the one or more carriers. According to some embodiments, this permits the network operator to better utilize radio network resources by over subscribing carrier power levels. The operator can do this without exposing radio hardware to damage by adaptive learning of Mean Power Limiting (MPL) parameters. Further, the degree of over subscription can be dynamically adjusted to suit network operating conditions. This can lead to improved quality of service metrics and increased radio sector cell size.

24 Claims, 9 Drawing Sheets

(51) Int. Cl.
*H04W 52/22* (2009.01)
*H04W 52/14* (2009.01)
*H04B 1/00* (2006.01)

(52) U.S. Cl.
CPC ........ *H04W 52/223* (2013.01); *H04W 52/225* (2013.01)

(56) References Cited

U.S. PATENT DOCUMENTS

| | | | |
|---|---|---|---|
| 2006/0014495 A1* | 1/2006 | Oshima | H04W 52/245 455/63.1 |
| 2010/0035645 A1 | 2/2010 | Chang et al. | |
| 2010/0035653 A1 | 2/2010 | Chang et al. | |
| 2011/0098012 A1* | 4/2011 | Sornin | H04B 17/0085 455/115.2 |
| 2013/0321123 A1* | 12/2013 | Wan | G05B 15/02 340/5.2 |
| 2014/0024325 A1 | 1/2014 | Iun et al. | |
| 2015/0063220 A1 | 3/2015 | Gandhi et al. | |
| 2015/0358038 A1 | 12/2015 | Koskinen | |
| 2016/0037580 A1* | 2/2016 | Shor | H04W 88/085 370/328 |

FOREIGN PATENT DOCUMENTS

| | | |
|---|---|---|
| CN | 104396205 A | 3/2015 |
| CN | 104718717 A | 6/2015 |
| EP | 1793509 A1 | 6/2007 |
| EP | 2629571 A1 | 8/2013 |

OTHER PUBLICATIONS

International Search Report and Written Opinion for International Patent Application No. PCT/IB2016/051854, dated Nov. 22, 2016, 12 pages.
Examination Report for European Patent Application No. 16714022.7, dated Aug. 26, 2019, 4 pages.
First Office Action for Chinese Patent Application No. 201680084288.2, dated Jun. 19, 2020, 9 pages.

\* cited by examiner

SYSTEMS AND METHODS FOR DETERMINING AN OVER POWER SUBSCRIPTION ADJUSTMENT FOR A RADIO EQUIPMENT

This application is a 35 U.S.C. § 371 national phase filing of International Application No. PCT/IB2016/051854, filed Mar. 31, 2016, the disclosure of which is incorporated herein by reference in its entirety.

TECHNICAL FIELD

The present disclosure relates to cellular communication networks and more particularly relates to adjusting a Radio Equipment (RE).

BACKGROUND

In wireless or cellular communication networks, a base station includes one or more Radio Equipment Controllers (RECs) and one or more Radio Equipments (REs) for communicating with one or more mobile devices served by the base station. The base station may serve multiple carriers where each carrier may cover a different geographic region and/or provide service on a different frequency. Whether or not a mobile device is able to connect to the base station on one or more of these carriers depends on several factors, including the transmit power of the base station.

In cellular networks, an REC configures the maximum carrier power based on a power rating of a Power Amplifier (PA) reported by the RE. The REC receives the PA power rating from the RE during startup. When the REC computes the carrier power, it uses the PA power rating to limit the maximum carrier power in the baseband signal sent to the RE.

The operating carrier power directly affects the cell size and the quality of the service. Generally in operator networks, Radio Frequency (RF) carriers operate at power levels well below their configured power limit.

The RE determines its PA power rating from database parameters which are stored during production. These parameters usually are over conservative, resulting in downlink RF carriers operating well below PA power ratings.

SUMMARY

Systems and methods for determining an over power subscription adjustment for a Radio Equipment (RE) are provided. In some embodiments, a method of operation of an RE includes determining an over power subscription adjustment for one or more carriers based on one or more system parameters and providing the over power subscription adjustment to a Radio Equipment Controller (REC) for the one or more carriers. According to some embodiments, this permits the network operator to better utilize radio network resources by over subscribing radio carrier power levels. The operator can do this without exposing radio hardware to damage by adaptive learning of Mean Power Limiting (MPL) parameters. Further, the degree of over subscription can be dynamically adjusted to suit network operating conditions. This can lead to improved quality of service metrics and increased radio sector cell size.

In some embodiments, the method also includes updating the over power subscription adjustment for the one or more carriers based on current operating conditions and providing the over power subscription adjustment to the REC for the one or more carriers.

In some embodiments, the one or more system parameters include a number of active carriers served by the RE, the Radio Access Type (RAT) of the active carriers served by the RE, and/or the average carrier power utilization of the active carriers served by the RE.

In some embodiments, determining the over power subscription adjustment for the one or more carriers includes determining the over power subscription adjustment for the one or more carriers using a statistical process based on the one or more system parameters.

In some embodiments, determining the over power subscription adjustment for the one or more carriers includes determining the over power subscription adjustment for the one or more carriers using an Artificial Neural Network (ANN) based on the one or more system parameters. In some embodiments, the ANN is a Bayesian ANN.

In some embodiments, the over power subscription adjustment for one or more carriers includes a baseband power adjustment and/or a MPL timing adjustment.

In some embodiments, determining the over power subscription adjustment includes determining that a baseband power adjustment is needed and then determining the baseband power adjustment. The method also includes determining that an MPL timing adjustment is needed and then determining the MPL timing adjustment.

In some embodiments, determining that the baseband power adjustment is needed includes determining that a signal level of the carriers is consistently below a mean power threshold for the carriers and, in response, determining an increase to the baseband power for the carriers.

In some embodiments, determining that the baseband power adjustment is needed and determining that the MPL timing adjustment is needed includes determining a probability that the baseband power adjustment is needed and a probability that the MPL timing adjustment is needed. The method also includes determining the adjustment of whichever has the greater probability of needing adjustment.

In some embodiments, the method also includes saving the over power subscription adjustment for the one or more carriers. In some embodiments, the one or more carriers is a single carrier served by the RE. In some embodiments, the one or more carriers is more than one carrier served by the RE and the over power subscription adjustment applies to each of the carriers.

In some embodiments, providing the over power subscription adjustment to the REC includes sending a Common Public Radio Interface (CPRI) message to the REC.

In some embodiments, an RE includes a network interface configured to communicatively couple the RE to at least one REC and circuitry. The circuitry is configured to determine an over power subscription adjustment for one or more carriers based on one or more system parameters and provide the over power subscription adjustment to the at least one REC for the one or more carriers.

In some embodiments, an RE is adapted to determine an over power subscription adjustment for one or more carriers based on one or more system parameters and provide the over power subscription adjustment to the at least one REC for the one or more carriers. In some embodiments, the RE is adapted to perform any of the methods discussed above.

In some embodiments, a computer program includes instructions which, when executed on at least one processor, cause the at least one processor to carry out any of the methods discussed above. In some embodiments, a carrier containing the computer program is an electronic signal, an optical signal, a radio signal, or a computer readable storage medium.

In some embodiments, an RE includes an over power subscription adjustment module operative to determine an over power subscription adjustment for one or more carriers based on one or more system parameters and a communication module operative to provide the over power subscription adjustment to the at least one REC for the one or more carriers.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
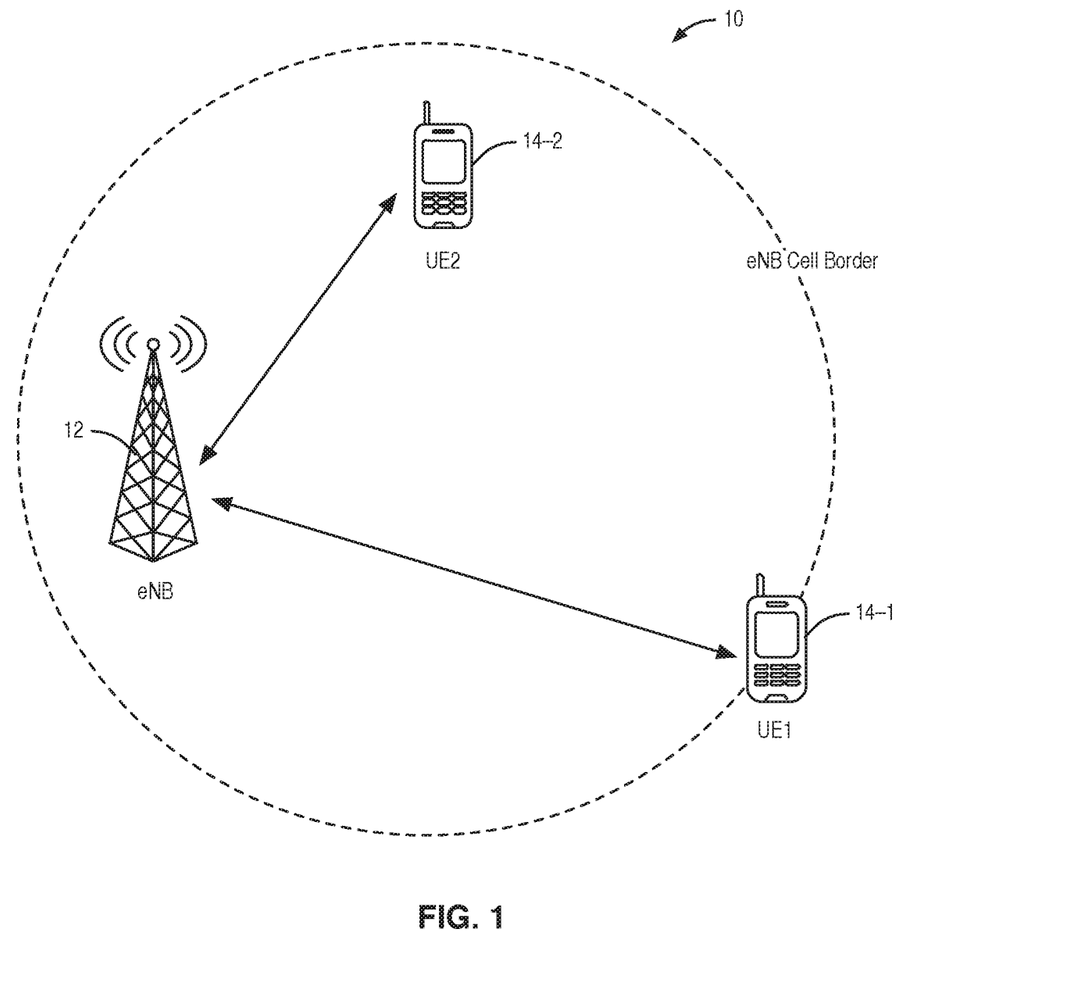
FIG. 1 illustrates a wireless communication network with multiple wireless devices and a base station, according to some embodiments of the present disclosure.

FIG. 1 illustrates a wireless communication network 10 with a base station 12 and multiple wireless devices 14-1 and 14-2, according to some embodiments of the present disclosure. In some embodiments, the wireless devices are referred to as User Equipment (UE) 14-1 and 14-2 (sometimes referred to herein as UE 14 and UEs 14) and the base station 12 is referred to as an evolved Node B (eNB) 12. While the term UE is generally used herein, a UE may be any type of wireless device which is capable of at least communication through wireless communication.

Notably, much of the discussion herein focuses on embodiments in which the wireless communication network 10 is a $3^{rd}$ Generation Partnership Project (3GPP) Long Term Evolution (LTE) cellular communications network. As such, 3GPP terminology is oftentimes used herein. However, while the embodiments described herein focus on 3GPP LTE, the embodiments and concepts disclosed herein may be used in any suitable type of existing or future cellular communications network including, for example, $3^{rd}$ Generation (3G) networks (e.g. Universal Mobile Telecommunications System (UMTS)), $4^{th}$ Generation (4G) networks (Worldwide Interoperability for Microwave Access (WiMAX), LTE, Long Term Evolution Advanced (LTE-A)), $5^{th}$ Generation (5G) or other future networks.

In FIG. 1, eNB 12 is shown serving a first UE 14-1 and a second UE 14-2. In this example, UE 14-1 is on or near the eNB cell border. As such, UE 14-1 might be able to obtain a better signal if the eNB 12 were able to transmit at higher power levels, essentially extending the eNB cell border.

Figure 2:
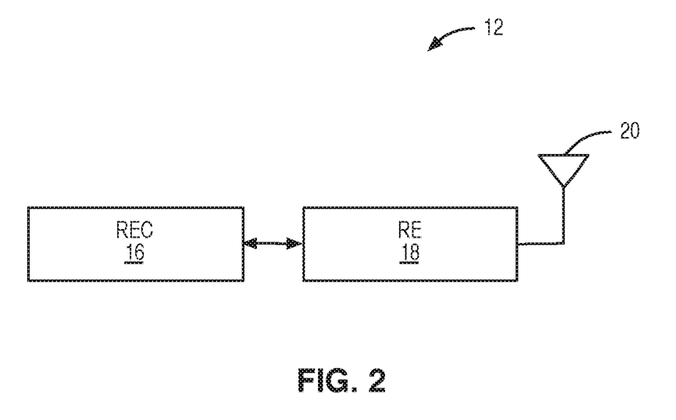
FIG. 2 is a schematic diagram of the base station including a Radio Equipment Controller (REC) and a Radio Equipment (RE), according to some embodiments of the present disclosure.

FIG. 2 is a schematic diagram of the eNB 12 including a Radio Equipment Controller (REC) 16 and a Radio Equipment (RE) 18 connected to one or more antennas 20, according to some embodiments of the present disclosure. In cellular networks, the REC 16 configures the maximum carrier power based on a power rating of a Power Amplifier (PA) reported by the RE 18. The REC 16 receives the PA power rating from the RE 18 during startup. When the REC 16 computes the carrier power, it uses the PA power rating to limit the maximum carrier power in the baseband signal sent to the RE 18.

The operating carrier power directly affects the cell size and the quality of the service. Generally in operator networks, Radio Frequency (RF) carriers operate at power levels well below their configured power limit. The RE 18 determines its PA power rating from database parameters which are stored during production. These parameters usually are over conservative, resulting in downlink RF carriers operating well below PA power ratings.

In some instances, the PA power rating of the radio is set in the RE 18 at production and used by the REC 16 to set the maximum carrier power allocation. This carrier power limiting does not take into account a network operator's operational profiles, and once carriers are activated, there is no dynamic re-allocation of carrier powers which takes into account current operating conditions.

Excessive carrier power limiting results in signal degradation which could also produce poor Error Vector Magnitude (EVM) radio performance. Also, there is no attempt to over subscribe carrier powers which would provide power and equipment usage savings. Systems and methods are needed to address these shortcomings.

Systems and methods for determining an over power subscription adjustment for an RE 18 are provided. In some embodiments, a method of operation of an RE 18 includes determining an over power subscription adjustment for one or more carriers based on one or more system parameters and providing the over power subscription adjustment to an REC 16 for the one or more carriers. According to some embodiments, this permits the network operator to better utilize radio network resources by over subscribing radio carrier power levels. The operator can do this without exposing radio hardware to damage by adaptive learning of Mean Power Limiting (MPL) parameters. Further, the degree of over subscription can be dynamically adjusted to suit network operating conditions. This can lead to improved quality of service metrics and increased radio sector cell size.

Figure 3:
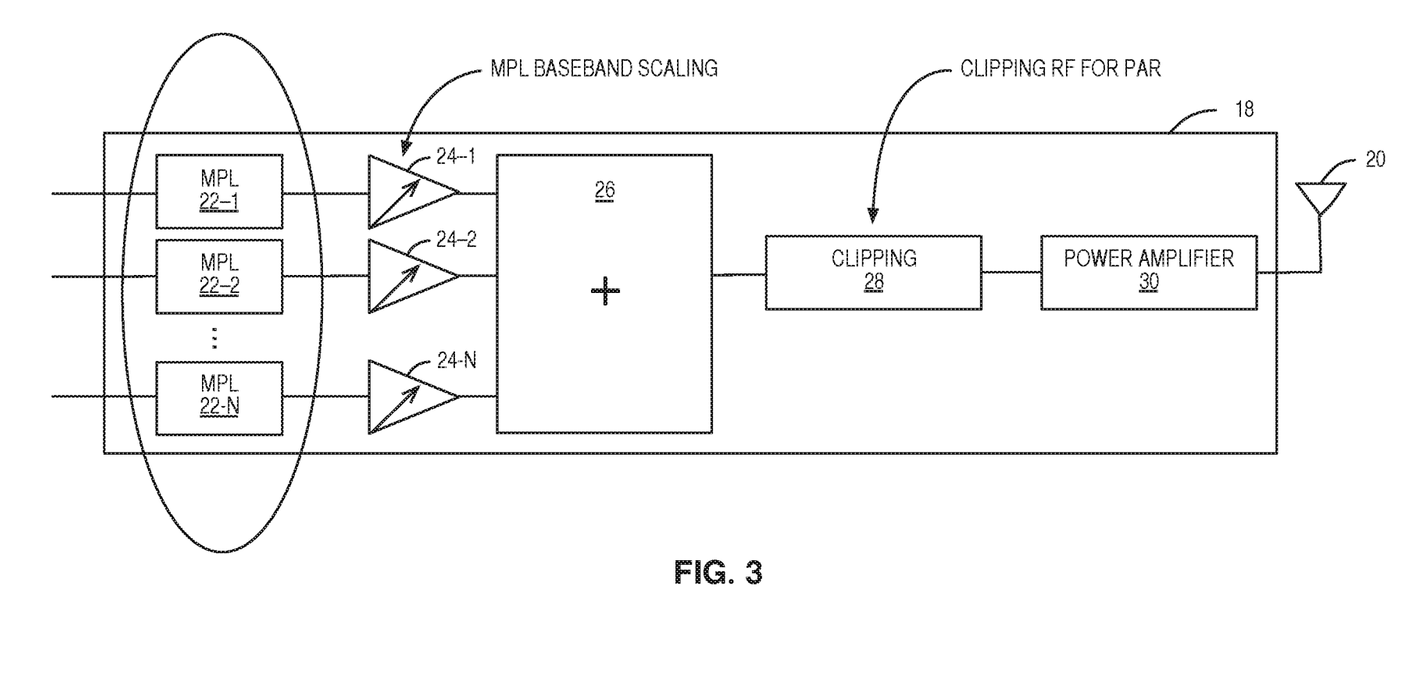
FIG. 3 is a schematic diagram of the RE of the base station including Mean Power Limiting (MPL) functionality, according to some embodiments of the present disclosure.

As an example of how some of these concepts are implemented in the RE 18, FIG. 3 is a schematic diagram of the RE 18 of the eNB 12 including MPL functionality, according to some embodiments of the present disclosure. As shown, multiple carrier signals enter the RE 18 as baseband signals sent from the REC 16. Each of the signals passes through an MPL function 22-1 through 22-N, where N is the number of carrier signals entering the RE 18. These signals then pass through MPL baseband scaling 24-1 through 24-N and are combined into a single signal by adder 26. FIG. 3 also shows that the output of adder 26 passes through a clipping 28 before entering the PA 30 and being transmitted by the at least one antenna 20.

The MPL functions 22-1 through 22-N keep the carrier signal power in the radio filter branches within predefined limits. If the signal power in the filter branches becomes too high, the consequences are signal degradation and in the worst case damage to the PA 30.

The MPL functionality is handled by the RE 18. The software only needs to configure the MPL threshold value for different carrier setups. The baseband signals in the filter branches are scaled by the scaling 24-1 through 24-N. The RF input into the PA 30 is clipped by the clipping 28 to provide Peak-to-Average Ratio (PAR) control.

The sum of the measured signal powers for the individual filter branches in the RF branch is then calculated and compared to a threshold value. If the measured power ($P_{est}$) is higher than the threshold value ($P_{th}$), the signals in all of the filter branches within the pool are attenuated by a factor $\sqrt{(P\_th/P\_est)}$ during the next measurement interval. As used herein, a pool means two or more filter branches which are grouped together for the purpose of MPL. The sum of the measured signal powers for the individual filter branches in the pool is then calculated and compared to the threshold value $\sqrt{(P_{th})}$.

Figure 4:
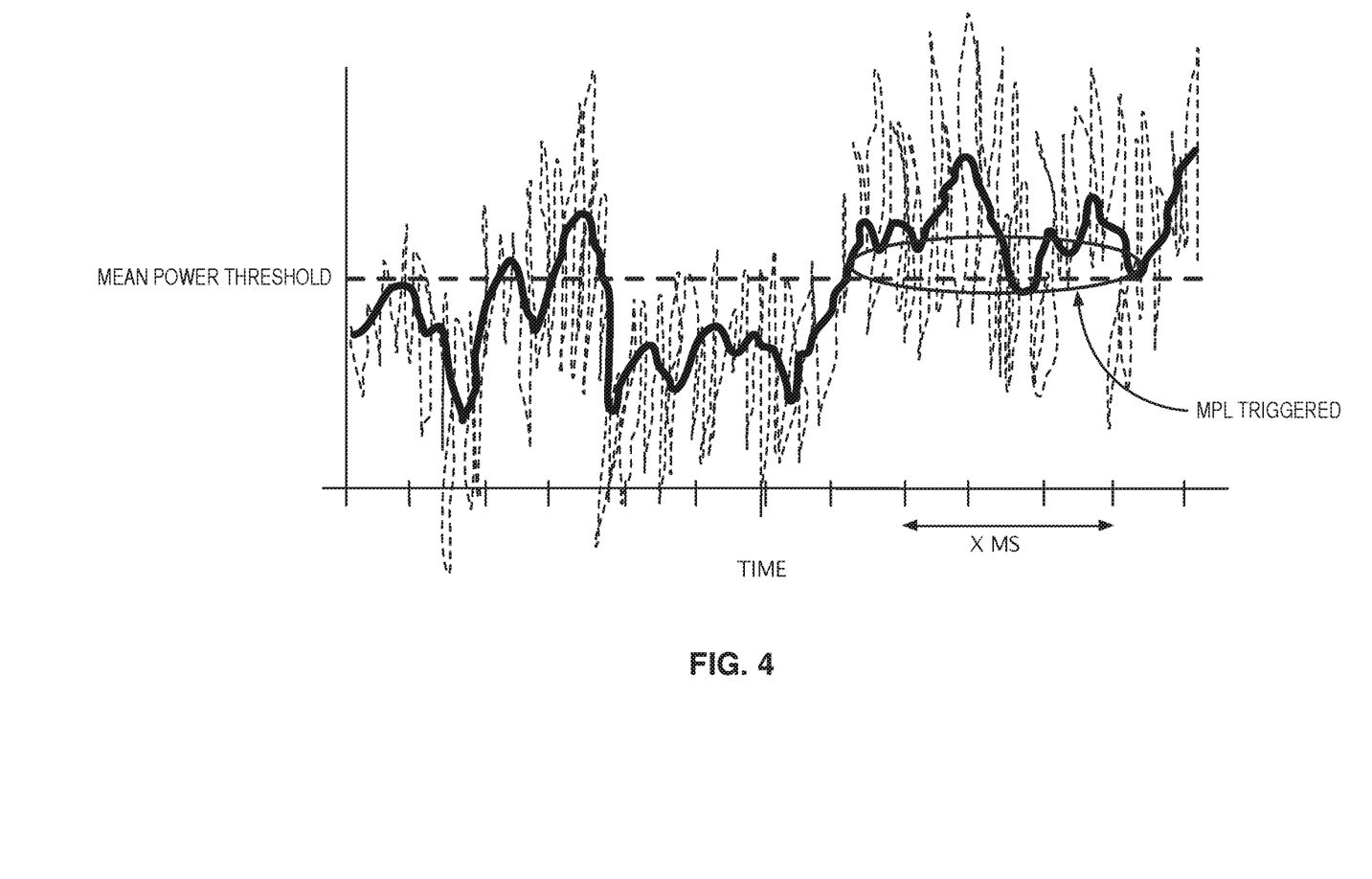
FIG. 4 illustrates an example use of the MPL functionality, according to some embodiments of the present disclosure.

FIG. 4 illustrates an example use of the MPL functionality, according to some embodiments of the present disclosure. The dashed line shows instantaneous power levels. The bold line shows a time averaged value of the instantaneous power. The mean power threshold $P_{th}$ is shown as a horizontal dashed line. When the measured power $P_{est}$ exceeds the $P_{th}$ for a certain time, MPL is triggered. Adjusting this value of the MPL timing, additional signal gains may be achieved by allowing additional spikes that exceed the mean power threshold $P_{th}$ before MPL is triggered. Also, if the signal is consistently below the mean power threshold $P_{th}$, a baseband power adjustment may be communicated to the REC 16 to increase the power of the baseband signals received.

Figure 5:
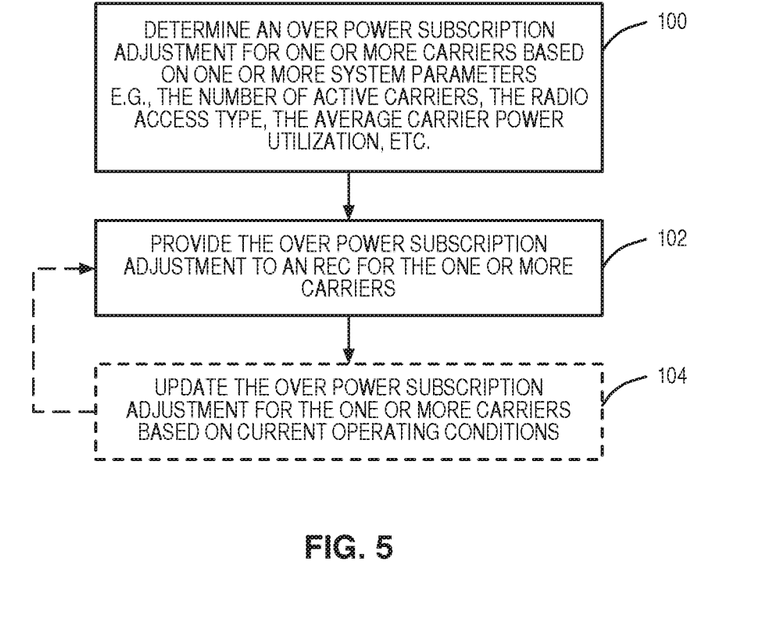
FIG. 5 illustrates a process for determining an over power subscription adjustment for the RE, according to some embodiments of the present disclosure.

FIG. 5 illustrates a process for determining an over power subscription adjustment for the RE 18, according to some embodiments of the present disclosure. The RE 18 determines an over power subscription adjustment for one or more carriers based on one or more system parameters (step 100). For example, these system parameters may include the number of active carriers served by the RE 18, the RAT of the active carriers served by the RE 18, the average carrier power utilization of the active carriers served by the RE 18, etc.

Also, as discussed above, the over power subscription adjustment could include a baseband power adjustment and/or an MPL timing adjustment for one carrier or multiple carriers. For multiple carriers, the same over power subscription adjustment might be used for each of the carriers, or there might be separate over power subscription adjustment values for each carrier being adjusted.

The RE 18 provides the over power subscription adjustment to the REC 16 for the one or more carriers (step 102). In some embodiments, providing the over power subscription adjustment to the REC 16 comprises sending a Common Public Radio Interface (CPRI) message to the REC 16. The RE 18 may then optionally update the over power subscription adjustment for the one or more carriers based on current operating conditions (step 104). In some embodiments, this process returns to step 102 to again provide the values to the REC 16 and continue to update the over power subscription adjustment as operating conditions change. In some embodiments, this over power subscription adjustment is updated over time as a Bayesian or probabilistic Artificial Neural Network (ANN) learns optimal operating parameters.

Figure 6:
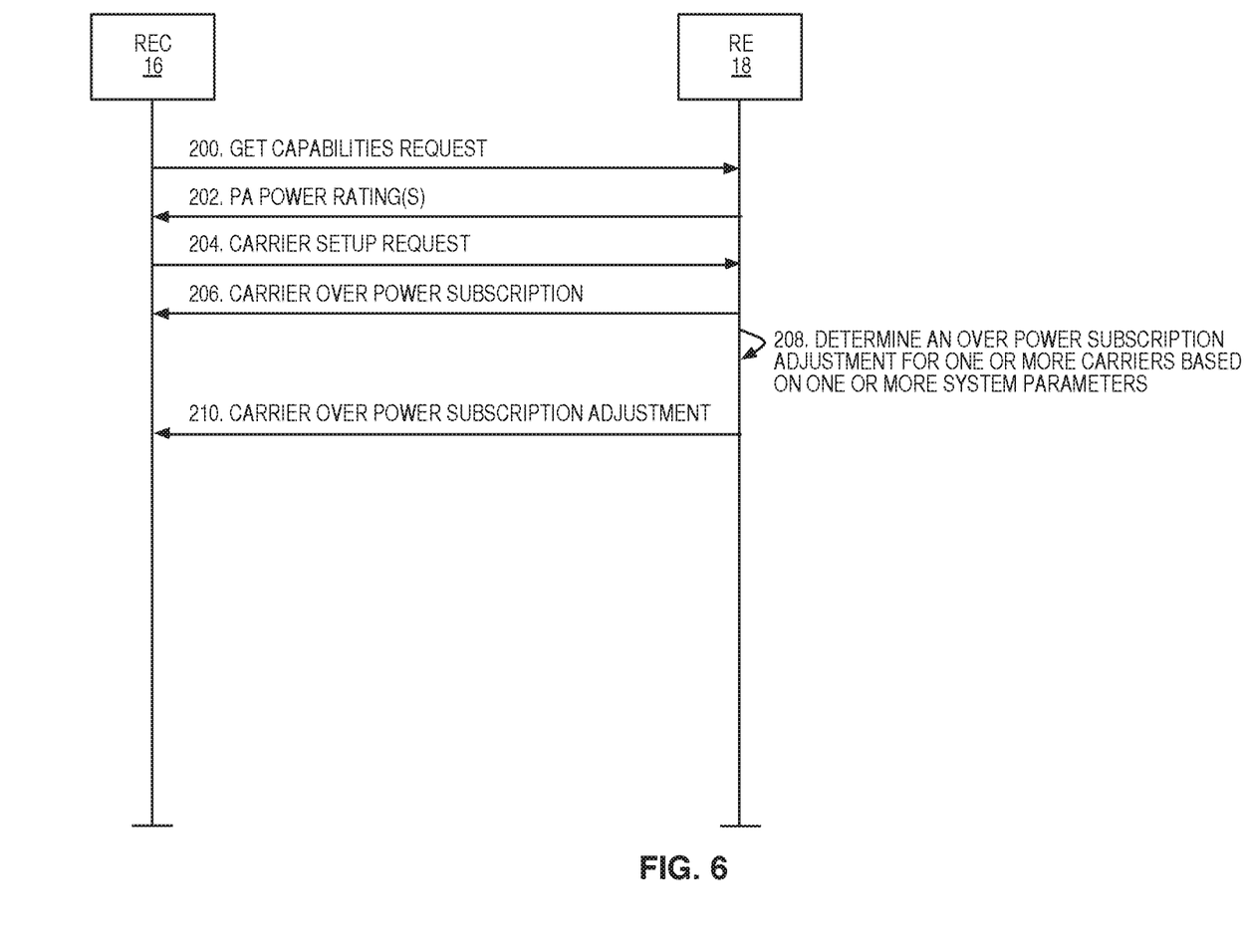
FIG. 6 illustrates a process for communicating the over power subscription adjustment for the RE to the REC, according to some embodiments of the present disclosure.

One example of this process is shown in FIG. 6 which illustrates a process for communicating the over power subscription adjustment for the RE 18 to the REC 16, according to some embodiments of the present disclosure. When an RE 18 restarts, the REC 16 sends a get capabilities request message (step 200). The RE 18 responds with the PA power rating(s) for the RF branches (step 202). When the REC 16 sends a carrier setup request (step 204), the RE 18 responds with a carrier power offset scaling factor, or over power subscription, which it reads from FLASH (step 206). The REC 16 uses this scaling factor to increase or decrease the carrier baseband power level, for all the activated carriers.

Periodically the RE 18 uses the MPL function to check that the measured power $P_{est}$ of all active carriers does not exceed the carrier power PA input threshold $P_{th}$. In this embodiment, the Bayesian ANN computes the probability of whether the carrier baseband power level should be scaled up or down or if the MPL measurement parameters should be adjusted (step 208). If a baseband adjustment is required, the RE 18 sends a request to adjust the carrier over power subscription (step 210).

Figure 7:
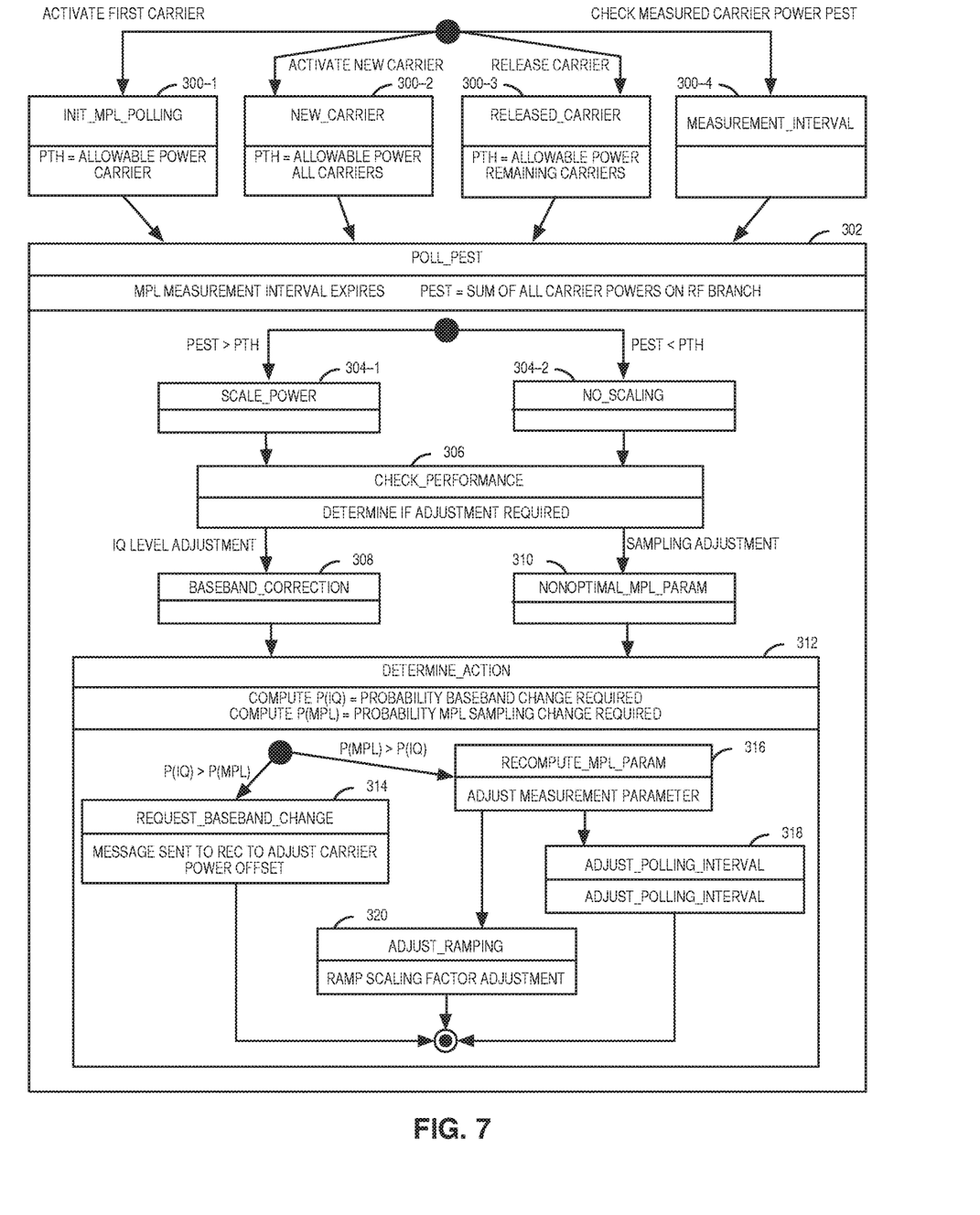
FIG. 7 illustrates a process for determining an over power subscription adjustment for the RE including a baseband power adjustment and/or an MPL timing adjustment, according to some embodiments of the present disclosure.

The carrier power over-subscription algorithm is run when a carrier is setup/activated, when a carrier is released, and periodically while there are active carriers. The MPL process is started when the first carrier is activated on the RF radio branch. Periodically, MPL checks if carrier power should be scaled, and the Bayesian ANN determines if an adjustment is required in carrier over subscription or an adjustment is required to its sampling parameters. FIG. 7 illustrates a process for determining an over power subscription adjustment for the RE 18 including a baseband power adjustment and/or an MPL timing adjustment, according to some embodiments of the present disclosure.

As shown, the process can be started in four different ways, or some combination of these. Each of these will be discussed in more detail below. Upon activation of the first carrier, the MPL polling is initiated and the mean power threshold $P_{th}$ is calculated as the allowable carrier power (step 300-1). Upon activating a new carrier, the mean power threshold $P_{th}$ is calculated as the allowable power for all carriers (step 300-2). Upon the release of a carrier, the mean power threshold $P_{th}$ is calculated as the allowable power for all remaining carriers (step 300-3). Upon the expiration of the measurement interval, the mean power threshold $P_{th}$ does not need to be updated (step 300-4).

At this point, the MPL polling is active and the measured power $P_{est}$ is calculated as the sum of all carrier powers on the RF branch (step 302). If the measured power $P_{est}$ exceeds the mean power threshold $P_{th}$, the power is scaled (step

304-1). Otherwise, there is no power scaling (step 304-2). Next, the performance is checked to determine if any adjustment is required (step 306). If a baseband correction is required (step 308) or a sampling adjustment is required (step 310), then the determine action process is initiated.

In order to determine the action to perform, the probability that a baseband change is required is computed and the probability that an MPL sampling change is required is computed (step 312). These probabilities may be computed by a statistical process, a probabilistic system, an ANN, a Bayesian ANN, or any other suitable process.

If the probability that a baseband change is required is greater than the probability that an MPL sampling change is required, the baseband change is computed and a message is sent to the REC 16 to adjust carrier power offset (step 314). Otherwise, an MPL parameter is recomputed and the measurement parameter is adjusted (step 316). The RE 18 then adjusts the polling interval (step 318) and may also adjust the ramp scaling factor (step 320).

Specific use cases are now discussed in the context of FIG. 7.

Use Case: Activate the First Carrier:
First carrier is activated
RE 18 computes PA input threshold $P_{th}$ for active carrier
RE 18 checks measured carrier power level against the PA input maximum
Baseband level scaled down by MPL H/W if threshold exceeded Use Case: Activate Another Carrier:
For each RF branch:
RE 18 computes PA input threshold $P_{th}$ for all active carriers
RE 18 checks measured carrier power levels of all active carriers against PA input threshold
Baseband level scaled down by MPL H/W if threshold exceeded
The Bayesian ANN computes the probability that the REC 16 has to scale up P(scaleUp) or scale down P(scaleDn) or modify MPL parameters P(mplParam).
RE's 18 Bayesian ANN determines the action based on the probabilities:
  If P(scaleUp)>P(scaleDn)>P(mplParam): RE 18 sends an adjustment request to the REC 16 to scale up baseband carrier power
  If P(scaleDn)>P(scaleUp)>P(mplParam): RE 18 sends an adjustment request to the REC 16 to scale down baseband carrier power
  If P(mplParam)>P(scaleDn && P(scaleUp): MPL function adjusts the measurement interval or threshold adjustment rate and stores these parameters in FLASH.

Figure 8:
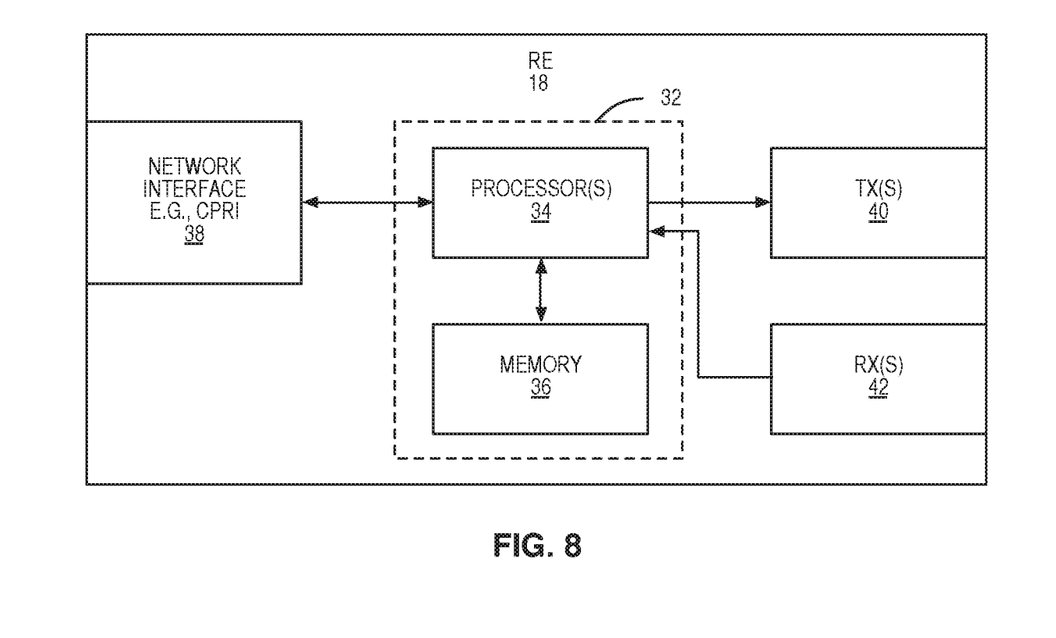
FIG. 8 is a diagram of an RE according to some embodiments of the present disclosure.

Use Case: Release a Carrier:
For each RF branch:
If there is still active carrier(s):
  RE 18 computes PA input threshold $P_{th}$ for all active carriers
  RE 18 checks measured carrier power levels of all active carriers against PA input threshold
  Baseband level scaled down by MPL H/W if threshold exceeded
  The Bayesian ANN computes the probability that the REC 16 has to scale up P(scaleUp) or scale down P(scaleDn) or modify MPL parameters P(mplParam)
  The Bayesian ANN of RE 18 determines the action based on the probabilities:
    If P(scaleUp)>P(scaleDn)>P(mplParam): RE 18 sends an adjustment request to the REC 16 to scale up baseband carrier power
    If P(scaleDn)>P(scaleUp)>P(mplParam): RE 18 sends an adjustment request to the REC 16 to scale down baseband carrier power
    If P(mplParam)>P(scaleDn && (P(scaleUp): MPL function adjusts the measurement interval or threshold adjustment rate and stores these parameters in FLASH Use Case: MPL Measurement Interval:
For each RF branch:
RE 18 checks measured carrier power levels of all active carriers against PA input threshold
Baseband level scaled down by MPL H/W if threshold exceeded
The Bayesian ANN computes the probability that the REC 16 has to scale up P(scaleUp) or scale down P(scaleDn) or modify MPL parameters P(mplParam)
RE's 18 Bayesian ANN determines the action based on the probabilities:
  If P(scaleUp)>P(scaleDn)>P(mplParam): RE 18 sends an adjustment request to the REC 16 to scale up baseband carrier power
  If P(scaleDn)>P(scaleUp)>P(mplParam): RE 18 sends an adjustment request to the REC 16 to scale down baseband carrier power
  If P(mplParam)>P(scaleDn && P(scaleUp): MPL function adjusts the measurement interval or threshold adjustment rate and stores these parameters in FLASH FIG. 8 is a diagram of an RE 18 according to some embodiments of the present disclosure. As illustrated, the RE 18 includes circuitry 32 which includes at least one processor 34 and memory 36. The RE 18 also includes a network interface 38 which could be a CPRI interface. The RE 18 also includes one or more transmitters 40, and one or more receivers 42. In some embodiments, RE 18, or the functionality of the RE 18 described with respect to any one of the embodiments described herein, is implemented in software that is stored in, e.g., the memory 36 and executed by the processor 34.

In some embodiments, a computer program including instructions which, when executed by at least one processor 34, causes the at least one processor 34 to carry out the functionality of the RE 18 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 36.

Figure 9:
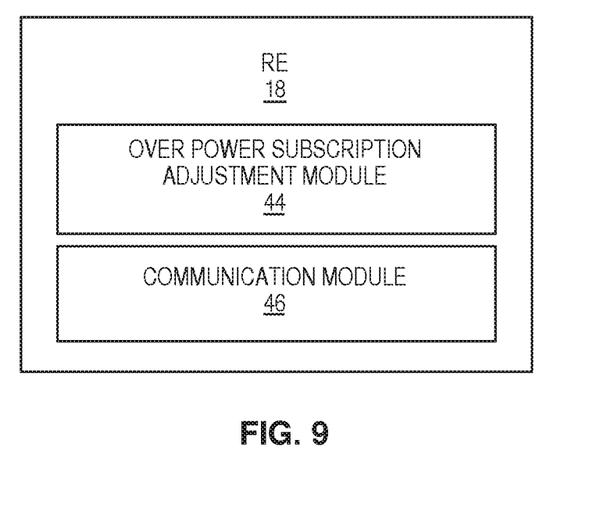
FIG. 9 is a diagram of an RE including modules according to some embodiments of the present disclosure.

FIG. 9 is a diagram of an RE 18 including modules according to some embodiments of the present disclosure. An over power subscription adjustment module 44 and a communication module 46 are each implemented in software that, when executed by a processor of the RE 18, causes the RE 18 to operate according to one of the embodiments described herein. The over power subscription adjustment module 44 operates to determine an over power subscription adjustment for one or more carriers based on one or more system parameters. The communication module 46 operates to provide the over power subscription adjustment to the at least one REC 16 for the one or more carriers.

The following acronyms are used throughout this disclosure.

3G 3$^{rd}$ Generation
3GPP 3$^{rd}$ Generation Partnership Project 4G 4th Generation
5G 5th Generation
ANN Artificial Neural Network
CPRI Common Public Radio Interface
eNB evolved Node B
EVM Error Vector Magnitude
LTE Long Term Evolution
LTE-A Long Term Evolution Advanced
MPL Mean Power Limiting
PA Power Amplifier
PAR Peak-to-Average Ratio
RAT Radio Access Type
RE Radio Equipment
REC Radio Equipment Controller
RF Radio Frequency
UE User Equipment
UMTS Universal Mobile Telecommunications System
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operation of a Radio Equipment, RE, comprising:
    determining an over power subscription adjustment for one or more carriers based on one or more system parameters where the over power subscription adjustment for the one or more carriers comprises a baseband power adjustment and a Mean Power Limiting, MPL, timing adjustment; and
    providing the over power subscription adjustment to a Radio Equipment Controller, REC, for the one or more carriers;
    wherein determining the over power subscription adjustment for the one or more carriers comprises:
    determining that the baseband power adjustment is needed for the one or more carriers where the baseband power adjustment is either an increase to the baseband power for the one or more carriers or a decrease to the baseband power for the one or more carriers;
    in response to determining that the baseband power adjustment is needed, determining the baseband power adjustment for the one or more carriers;
    determining that the MPL timing adjustment is needed for the one or more carriers where the MPL timing adjustment is either an increase to the MPL timing for the one or more carriers or a decrease to the MPL timing for the one or more carriers; and
    in response to determining that the MPL timing adjustment is needed, determining the MPL timing adjustment for the one or more carriers.

2. The method of claim 1 further comprising:
    updating the over power subscription adjustment for the one or more carriers based on current operating conditions; and
    providing the over power subscription adjustment to the REC for the one or more carriers.

3. The method of claim 1 wherein the one or more system parameters comprises at least one of the group consisting of:
    a number of active carriers served by the RE,
    a Radio Access Type, RAT, of the active carriers served by the RE, and
    an average carrier power utilization of the active carriers served by the RE.

4. The method of claim 1 wherein determining the over power subscription adjustment for the one or more carriers comprises determining the over power subscription adjustment for the one or more carriers using a statistical process based on the one or more system parameters.

5. The method of claim 1 wherein determining the over power subscription adjustment for the one or more carriers comprises determining the over power subscription adjustment for the one or more carriers using an Artificial Neural Network, ANN, based on the one or more system parameters.

6. The method of claim 5 wherein the ANN is a Bayesian ANN.

7. The method of claim 1 wherein:
    determining that the baseband power adjustment is needed for the one or more carriers comprises determining that a signal level of the one or more carriers is consistently below a mean power threshold for the one or more carriers; and
    determining the baseband power adjustment for the one or more carriers comprises determining the increase to the baseband power for the one or more carriers.

8. The method of claim 1 wherein determining that the baseband power adjustment is needed and determining that the MPL timing adjustment is needed comprises:
    determining a probability that the baseband power adjustment is needed and a probability that the MPL timing adjustment is needed;
    in response to determining that the probability that the baseband power adjustment is needed is greater than the probability that the MPL timing adjustment is needed:
        determining that the baseband power adjustment is needed; and
        determining that the MPL timing adjustment is not needed; and
    in response to determining that the probability that the baseband power adjustment is needed is not greater than the probability that the MPL timing adjustment is needed:
        determining that the baseband power adjustment is not needed; and
        determining that the MPL timing adjustment is needed.

9. The method of claim 1 further comprising saving the over power subscription adjustment for the one or more carriers.

10. The method of claim 1 wherein the one or more carriers is a single carrier served by the RE.

11. The method of claim 1 wherein the one or more carriers is more than one carrier served by the RE and the over power subscription adjustment applies to each of the more than one carrier.

12. The method of claim 1 wherein providing the over power subscription adjustment to the REC comprises sending a Common Public Radio Interface, CPRI, message to the REC.

13. A Radio Equipment, RE, comprising:
    a network interface configured to communicatively couple the RE to at least one Radio Equipment Controller, REC; and
    circuitry configured to:
        determine an over power subscription adjustment for one or more carriers based on one or more system parameters where the over power subscription adjustment for the one or more carriers comprises a baseband power adjustment and a Mean Power Limiting, MPL, timing adjustment; and provide the over power subscription adjustment to the at least one REC for the one or more carriers;
wherein determining the over power subscription adjustment for the one or more carriers comprises the circuitry being configured to:
determine that the baseband power adjustment is needed for the one or more carriers where the baseband power adjustment is either an increase to the baseband power for the one or more carriers or a decrease to the baseband power for the one or more carriers;
in response to determining that the baseband power adjustment is needed, determine the baseband power adjustment for the one or more carriers;
determine that the MPL timing adjustment is needed for the one or more carriers where the MPL timing adjustment is either an increase to the MPL timing for the one or more carriers or a decrease to the MPL timing for the one or more carriers; and
in response to determining that the MPL timing adjustment is needed, determine the MPL timing adjustment for the one or more carriers.

14. The RE of claim 13 wherein the circuitry is further configured to:
update the over power subscription adjustment for the one or more carriers based on current operating conditions; and
provide the over power subscription adjustment to the REC for the one or more carriers via the network interface.

15. The RE of claim 13 wherein the one or more system parameters comprises at least one of the group consisting of:
a number of active carriers served by the RE,
a Radio Access Type, RAT, of the active carriers served by the RE, and
an average carrier power utilization of the active carriers served by the RE.

16. The RE of claim 13 wherein being configured to determine the over power subscription adjustment for the one or more carriers comprises being configured to determine the over power subscription adjustment for the one or more carriers using a statistical process based on the one or more system parameters.

17. The RE of claim 13 wherein being configured to determine the over power subscription adjustment for the one or more carriers comprises being configured to determine the over power subscription adjustment for the one or more carriers using an Artificial Neural Network, ANN, based on the one or more system parameters.

18. The RE of claim 17 wherein the ANN is a Bayesian ANN.

19. The RE of claim 13 wherein being configured to determine that the baseband power adjustment is needed and being configured to determine that the MPL timing adjustment is needed comprises being configured to:
determine a probability that the baseband power adjustment is needed and a probability that the MPL timing adjustment is needed;
in response to determining that the probability that the baseband power adjustment is needed is greater than the probability that the MPL timing adjustment is needed:
determine that the baseband power adjustment is needed; and
determine that the MPL timing adjustment is not needed; and
in response to determining that the probability that the baseband power adjustment is needed is not greater than the probability that the MPL timing adjustment is needed:
determine that the baseband power adjustment is not needed; and
determine that the MPL timing adjustment is needed.

20. The RE of claim 13 further configured to save the over power subscription adjustment for the one or more carriers.

21. The RE of claim 13 wherein the one or more carriers is a single carrier served by the RE.

22. The RE of claim 13 wherein the one or more carriers is more than one carrier served by the RE and the over power subscription adjustment applies to each of the more than one carrier.

23. The RE of claim 13 wherein being configured to provide the over power subscription adjustment to the REC comprises being configured to send a Common Public Radio Interface, CPRI, message to the REC via the network interface.

24. A Radio Equipment, RE, adapted to:
determine an over power subscription adjustment for one or more carriers based on one or more system parameters where the over power subscription adjustment for the one or more carriers comprises a baseband power adjustment and a Mean Power Limiting, MPL, timing adjustment; and
provide the over power subscription adjustment to at least one Radio Equipment Controller, REC, for the one or more carriers;
wherein determining the over power subscription adjustment for the one or more carriers comprises the RE being adapted to:
determine that the baseband power adjustment is needed for the one or more carriers where the baseband power adjustment is either an increase to the baseband power for the one or more carriers or a decrease to the baseband power for the one or more carriers;
in response to determining that the baseband power adjustment is needed, determine the baseband power adjustment for the one or more carriers;
determine that the MPL timing adjustment is needed for the one or more carriers where the MPL timing adjustment is either an increase to the MPL timing for the one or more carriers or a decrease to the MPL timing for the one or more carriers; and
in response to determining that the MPL timing adjustment is needed, determine the MPL timing adjustment for the one or more carriers.

* * * * *